United States Patent
Brocheton

(10) Patent No.: US 12,325,661 B2
(45) Date of Patent: Jun. 10, 2025

(54) LEAD FREE GLASS COMPOSITION FOR MICROCHANNEL PLATE FABRICATION

(71) Applicant: CORNING INCORPORATED, Corning, NY (US)

(72) Inventor: Yves Andre Henri Brocheton, Samoreau (FR)

(73) Assignee: CORNING INCORPORATED, Corning, NY (US)

( * ) Notice: Subject to any disclaimer, the term of this patent is extended or adjusted under 35 U.S.C. 154(b) by 224 days.

(21) Appl. No.: 17/487,007

(22) Filed: Sep. 28, 2021

(65) Prior Publication Data
US 2022/0098086 A1 Mar. 31, 2022

Related U.S. Application Data

(60) Provisional application No. 63/085,508, filed on Sep. 30, 2020.

(51) Int. Cl.
*C03C 3/093* (2006.01)
*C03C 3/068* (2006.01)
*C03C 3/091* (2006.01)
*C03C 3/095* (2006.01)

(52) U.S. Cl.
CPC ............ *C03C 3/093* (2013.01); *C03C 3/068* (2013.01); *C03C 3/091* (2013.01); *C03C 3/095* (2013.01)

(58) Field of Classification Search
CPC .................. C03C 3/091; C03C 3/093
See application file for complete search history.

(56) References Cited

U.S. PATENT DOCUMENTS

| | | | |
|---|---|---|---|
| 4,112,170 A | 9/1978 | Rauscher et al. | |
| 4,349,635 A | 9/1982 | Davis et al. | |
| 4,629,486 A | 12/1986 | Uchiyama et al. | |
| 5,015,909 A | 5/1991 | Zhong et al. | |
| 5,108,961 A | 4/1992 | Zhong et al. | |
| 5,849,649 A | 12/1998 | Poole | |
| 5,977,556 A | 11/1999 | Qiu et al. | |
| 10,336,647 B2 * | 7/2019 | Brocheton | ............... C03C 3/11 |
| 2004/0063564 A1 | 4/2004 | Kawai et al. | |
| 2007/0296085 A1 | 12/2007 | Coolbaugh et al. | |
| 2016/0122231 A1 | 5/2016 | Ishihara et al. | |
| 2018/0170796 A1 * | 6/2018 | Brocheton | ............. G02B 5/208 |

FOREIGN PATENT DOCUMENTS

| | | | |
|---|---|---|---|
| CN | 102313898 A | 1/2012 | |
| CN | 106630596 B | 7/2019 | |
| DE | 3909526 A1 | 10/1989 | |
| DE | 4222946 A1 | 1/1994 | |
| EP | 0460863 A1 | 12/1991 | |
| EP | 0439788 B1 | 4/1995 | |
| EP | 0779254 B1 | 3/2000 | |
| EP | 1156020 A1 * | 11/2001 | ............. C03C 3/089 |
| GB | 2120232 A | 11/1983 | |
| GB | 2218982 A | 11/1989 | |
| JP | 58-208151 A | 12/1983 | |
| JP | 02208235 A * | 8/1990 | ............... C03C 8/02 |
| JP | 04-331741 A | 11/1992 | |
| JP | 07-291651 A | 11/1995 | |
| JP | 2007073531 A * | 3/2007 | ............. C03C 3/091 |
| SU | 1717566 A1 | 3/1992 | |
| WO | 2012/000158 A1 | 1/2012 | |

OTHER PUBLICATIONS

International Search Report and Written Opinion of the International Searching Authority; PCT/US2021/051706; dated Jan. 4, 2022; pp. 13; European Patent Office.

* cited by examiner

*Primary Examiner* — Elizabeth A. Bolden

(57) ABSTRACT

Disclosed herein are lead free glass compositions having, in some embodiments, $SiO_2$ from 25 wt % to 60 wt %, $Al_2O_3$ from 0 wt % to 20 wt %, $B_2O_3$ from 0 wt % to 35 wt %, $ZrO_2$ from 0 wt % to 5 wt %, $Li_2O$ from 5 wt % to 17 wt %, $Na_2O$ from 3 wt % to 10 wt %, $K_2O$ from 1 wt % to 10 wt %, RO from 0 wt % to 20 wt %, wherein RO is an alkaline earth oxide, ZnO from 0 wt % to 15 wt %, and 0 wt % lead.

17 Claims, No Drawings

LEAD FREE GLASS COMPOSITION FOR MICROCHANNEL PLATE FABRICATION

CROSS-REFERENCE TO RELATED APPLICATIONS

This application claims the benefit of priority under 35 U.S.C. § 119 of U.S. Provisional Application Ser. No. 63/085,508 filed on Sep. 30, 2020, the content of which is relied upon and incorporated herein by reference in its entirety.

TECHNICAL FIELD

Embodiments of the present disclosure relate to glass substrates. More particularly, embodiments of the present disclosure relate to glass substrates for microchannel plate fabrication.

BACKGROUND

Microchannel plates (MCP) are thin, planar structures that contain many small diameter, parallel pores or channels oriented nearly perpendicular to the surface. Incoming ions, electrons, or energetic photons can easily ionize the pore walls. The secondary electrons from the ionization are then drawn down the channel by an electric field. As they strike the walls on the way, they generate a cascade of additional secondary electrons to the bottom end of the channel. The electric field is developed by applying a high voltage from one planar surface of the MCP to the other. Two MCPs may be used in a stack to produce an electron gain of one million electrons or more.

Their surface area may have arbitrarily formed outlines, so they can conform to the requirements of a wide range of detector configurations. MCPs are used in applications such as image intensification, night vision devices; photomultipliers for photon and particle detection using scintillators; UV spectrometers and time of flight (TOF) devices such as terrestrial and space flight mass spectrometers; scanning electron microscopes and residual gas analyzers. Their high gain and lightweight compact structure enable fabrication of low-mass, low-volume particle and photon detectors.

In the traditional process of MCP manufacturing, lead glass tubes are filled with glass rods. The tube and rod assemblies are thermally co-drawn, so that the tube collapses around the rod to produce long, slender fibers with a lead glass cladding, and an inner core glass. Fibers are then stacked in parallel and stretched again together. Multiple fiber assemblies are then fused together in parallel. Wafers are cut across the fiber assemblies, where the wafer plane is nearly perpendicular to the axis of the fibers.

The core glass is then etched away, leaving an array of channels. This lead glass capillary array is then heated in the presence of hydrogen, which chemically reduces the surface of the glass, leaving a resistive and emissive surface that is effective for electron amplification. However, the use of glasses containing lead oxide imposes constraints to respect safety regulations. Consequently, providing a lead-free glass which presents similar as current glasses used for those applications can be advantageous Accordingly, there is a need in the art for a lead-free glass which presents similar attributes as current glasses used for forming microchannel plates.

SUMMARY OF THE CLAIMS

A first embodiment of the present disclosure includes a glass composition, comprising: $SiO_2$ from 25 wt % to 60 wt %, $Al_2O_3$ from 0 wt % to 20 wt %, $B_2O_3$ from 0 wt % to 35 wt %, $ZrO_2$ from 0 wt % to 5 wt %, $Li_2O$ from 5 wt % to 17 wt %, $Na_2O$ from 3 wt % to 10 wt %, $K_2O$ from 1 wt % to 10 wt %, RO from 0 wt % to 20 wt %, wherein RO is an alkaline earth oxide, ZnO from 0 wt % to 15 wt %, and 0 wt % lead.

A second embodiment of the present disclosure includes a glass composition, comprising: $SiO_2$ from 30 wt % to 50 wt %, $Al_2O_3$ from 6 wt % to 15 wt %, $B_2O_3$ from 14 wt % to 28 wt %, $ZrO_2$ from 0 wt % to 3 wt %, $Li_2O$ from 3 wt % to 7 wt %, $Na_2O$ from 3 wt % to 8 wt %, $K_2O$ from 2 wt % to 8 wt %, RO from 0 wt % to 5 wt %, wherein RO is an alkaline earth oxide, ZnO from 1 wt % to 8 wt %, and 0 wt % lead.

A third embodiment of the present disclosure includes a glass composition of any of embodiments 1-2, wherein RO is one of CaO, MgO, SrO, BaO.

A fourth embodiment of the present disclosure includes a glass composition of any of embodiments 1-3, wherein $Li_2O+Na_2O+K_2O$ is 10 wt % to 22 wt %.

A fifth embodiment of the present disclosure includes a glass composition of any of embodiments 1-3, wherein $Li_2O+Na_2O+K_2O$ is 13 wt % to 20 wt %.

A sixth embodiment of the present disclosure includes a glass composition comprising: 44.7 wt % $SiO_2$, 10.7 wt % $Al_2O_3$, 22 wt % $B_2O_3$, 1.7 wt % $ZrO_2$, 5.1 wt % $Li_2O$, 5.4 wt % $Na_2O$, 4.7 wt % $K_2O$, 2.4 wt % MgO, 3.3 wt % CaO, and 0 wt % lead.

A seventh embodiment of the present disclosure includes a glass composition of any of embodiments 1-6, wherein a coefficient of thermal expansion of the glass composition is about $70 \times 10^{-7}$ per degrees Celsius to $85 \times 10^{-7}$ per degrees Celsius.

An eighth embodiment of the present disclosure includes a glass composition of any of embodiments 1-7, wherein a softening point of the glass composition is below about 700 degrees Celsius.

A ninth embodiment of the present disclosure includes a glass composition of any of embodiments 1-8, wherein a glass transition temperature ($T_g$) of the glass composition is 450 degrees Celsius to 550 degrees Celsius.

A tenth embodiment of the present disclosure includes a microchannel plate comprising the glass composition in any one of embodiments 1-8.

Other embodiments and variations of the present disclosure are discussed below

DETAILED DESCRIPTION

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the singular forms "a," "an," and "the" include plural references unless the context clearly dictates otherwise. Thus, for example, reference to "a" component includes aspects having two or more such components, unless the context clearly indicates otherwise.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range was explicitly recited. As an illustration, a numerical range of "about 1 to about 5" should be interpreted to include not only the explicitly recited values of about 1 to about 5, but also to include individual values and sub-ranges within the indicated range. Thus, included in this numerical range are individual values such as 2, 3, and 4, the sub ranges such as from 1-3, from 2-4, from 3-5, etc., as well as 1, 2, 3, 4, and 5 individually. The same principle applies to ranges reciting only one numerical value as a minimum or maximum. Furthermore, such an interpretation should apply regardless of the breadth of the range or the characteristics being described.

Disclosed are materials and components that can be used for, can be used in conjunction with, can be used in preparation for, or are products of the disclosed compositions and methods. These and other materials are disclosed herein, and it is understood that when combinations, subsets, interactions, groups, etc. of these materials are disclosed, that while specific reference to each various individual combination and permutation of these compounds may not be explicitly disclosed, each is specifically contemplated and described herein. For example, if a glass composition is disclosed and discussed and a number of different metal oxide additives are discussed, each and every combination of glass composition and metal oxide additive that is possible is specifically contemplated unless specifically indicated to the contrary. For example, if a class of glass compositions A, B, and C are disclosed, as well as a class of metal oxide additives D, E, and F, and an example combination of A+D is disclosed, then even if each is not individually recited, each is individually and collectively contemplated. Thus, in this example, each of the combinations A+E, A+F, B+D, B+E, B+F, C+D, C+E, and C+F is specifically contemplated and should be considered from disclosure of A, B, and C; D, E, and F; and the example combination of A+D. Likewise, any subset or combination of these is also specifically contemplated and disclosed. Thus, for example, the sub-group of A+E, B+F, and C+E is specifically contemplated and should be considered from disclosure of A, B, and C; D, E, and F; and the example combination of A+D. This concept applies to all aspects of the disclosure including, but not limited to, steps in methods of making and using the disclosed compositions. Thus, if there are a variety of additional steps that can be performed with any specific embodiment or combination of embodiments of the disclosed methods, each such combination is specifically contemplated and should be considered disclosed.

The glass compositions described herein can be prepared using known techniques known in the art. In some embodiments, the glass compositions described herein are used to form microchannel plates. Microchannel plates (MCPs) are thin wafers of electrically conducting glass which contain thousands of open channels or tubes. Each channel diameter is on the order of 10 to 15 microns. The plates are used for the amplification of X-rays, ions, or electrons. They are an essential component of a variety of electronic devices, including night vision goggles.

The principles of microchannel plate fabrication and operation are described in detail, for example, in U.S. Pat. No. 4,629,486 (Uchiyama et al.) and U.S. Pat. No. 4,112,170 (Rauscher). Briefly, the method, as there described, involves fusing solid rods of a leachable core material, preferably glass, within tubular pieces of relatively non-leachable skin glass. A bundle of such composite bodies is formed and fusion sealed. The bundle is then drawn down, cut into lengths, rebundled and further drawn. Ultimately, a composite article is obtained in which an interconnected glass matrix of the skin glass encases an array of leachable core elements. The composite is then exposed to a leachant, for example, hydrochloric or nitric acid, to remove the cores. This leaves the skin glass matrix with an array of channels corresponding to the array of core elements. The channels may be on the order of ten microns in diameter. The perforated plate, thus formed, is then heated in a hydrogen-containing atmosphere to produce a surface layer of reduced metal on the channel walls. However, the use of glasses compositions containing lead oxide imposes constraints with respect to safety regulations. Consequently, the glass compositions described herein advantageously provide a lead-free glass used to form microchannel plates.

In one embodiment, a glass composition comprises $SiO_2$ from 25 wt % to 60 wt %, $Al_2O_3$ from 0 wt % to 20 wt %, $B_2O_3$ from 0 wt % to 35 wt %, $ZrO_2$ from 0 wt % to 5 wt %, $Li_2O$ from 5 wt % to 17 wt %, $Na_2O$ from 3 wt % to 10 wt %, $K_2O$ from 1 wt % to 10 wt %, RO from 0 wt % to 20 wt %, wherein RO is a alkaline earth oxide, ZnO from 0 wt % to 15 wt %, and 0 wt % lead.

In some embodiments, a glass composition consists of (or consists essentially of): $SiO_2$ from 25 wt % to 60 wt %, $Al_2O_3$ from 0 wt % to 20 wt %, $B_2O_3$ from 0 wt % to 35 wt %, $ZrO_2$ from 0 wt % to 5 wt %, $Li_2O$ from 5 wt % to 17 wt %, $Na_2O$ from 3 wt % to 10 wt %, $K_2O$ from 1 wt % to 10 wt %, RO from 0 wt % to 20 wt %, wherein RO is a alkaline earth oxide, ZnO from 0 wt % to 15 wt %, and 0 wt % lead.

In some embodiments, the glass composition comprises: $SiO_2$ from 30 wt % to 50 wt %, $Al_2O_3$ from 6 wt % to 15 wt %, $B_2O_3$ from 14 wt % to 28 wt %, $ZrO_2$ from 0 wt % to 3 wt %, $Li_2O$ from 3 wt % to 7 wt %, $Na_2O$ from 3 wt % to 8 wt %, $K_2O$ from 2 wt % to 8 wt %, RO from 0 wt % to 5 wt %, wherein RO is a alkaline earth oxide, ZnO from 1 wt % to 8 wt %, and 0 wt % lead.

In some embodiments, the glass composition consists of (or consists essentially of): $SiO_2$ from 30 wt % to 50 wt %, $Al_2O_3$ from 6 wt % to 15 wt %, $B_2O_3$ from 14 wt % to 28 wt %, $ZrO_2$ from 0 wt % to 3 wt %, $Li_2O$ from 3 wt % to 7 wt %, $Na_2O$ from 3 wt % to 8 wt %, $K_2O$ from 2 wt % to 8 wt %, RO from 0 wt % to 5 wt %, wherein RO is a alkaline earth oxide, ZnO from 1 wt % to 8 wt %, and 0 wt % lead.

In some embodiments, the glass composition comprises 44.7 wt % $SiO_2$, 10.7 wt % $Al_2O_2$, 22 wt % $B_2O_3$, 1.7 wt % $ZrO_2$, 5.1 wt % $Li_2O$, 5.4 wt % $Na_2O$, 4.7 wt % $K_2O$, 2.4 wt % MgO, 3.3 wt % CaO, and 0 wt % lead.

In some embodiments, the glass composition consists of (or consists essentially of): 44.7 wt % $SiO_2$, 10.7 wt % $Al_2O_3$, 22 wt % $B_2O_3$, 1.7 wt % $ZrO_2$, 5.1 wt % $Li_2O$, 5.4 wt % $Na_2O$, 4.7 wt % $K_2O$, 2.4 wt % MgO, 3.3 wt % CaO, and 0 wt % lead.

In the glass compositions described herein, $SiO_2$ serves as the basic glass former. In some embodiments, the glass compositions described herein comprises $SiO_2$ from about 25 wt. % to about 60 wt. %, or preferably from about 30 wt. % to about 50 wt. %.

$Al_2O_3$ is another glass former used to make the glasses described herein. In some embodiments, the glass compositions described herein comprises $Al_2O_3$ from about 0 wt. % to about 20 wt. %, or preferably from about 6 wt. % to about 15 wt. %.

$B_2O_3$ is both a glass former and a flux that aids melting and lowers the melting temperature. It has an impact on both liquidus temperature and viscosity. Increasing $B_2O_3$ can be used to increase the liquidus viscosity of a glass. In some embodiments, the glass compositions described herein comprises $B_2O_3$ from about 0 wt. % to about 35 wt. %, or preferably from about 14 wt. % to about 28 wt. %.

In some embodiments, the glass compositions described herein comprises alkaline earth oxides, such as MgO, CaO, SrO, and BaO, from about 0 wt. % to about 20 wt. %, or preferably from about 0 wt. % to about 5 wt. %. The alkaline earth oxides provide the glass with various properties important to melting, fining, forming, and ultimate use.

In some embodiments, the glass compositions described herein comprises one or more alkaline oxides selected from the group consisting of $Li_2O$, $Na_2O$, $K_2O$, $Rb_2O$, and $Cs_2O$. In embodiments where the glass composition includes $Li_2O$, $Na_2O$, and $K_2O$, the total wt % of alkaline oxides ($Li_2O+Na_2O+K_2O$) in the glass composition is 10 wt % to 22 wt %, or preferably 13 wt % to 22 wt %.

As used herein, the "glass transition temperature" (Tg) of a material characterizes the temperature at which the glass transition occurs in an amorphous material. At temperatures below Tg, the material exists in a hard and brittle state and at temperatures above Tg, the material exists in a supercooled liquid state. Tg is always lower than the melting temperature of a material's crystalline state, if a crystalline state exists for the material. In some embodiments, the glass compositions disclosed herein have a glass transition temperature (Tg) of 450 degrees Celsius to 550 degrees Celsius.

A material such as an object formed from a glass composition can change in shape, area, or volume in response to a change in temperature. The "coefficient of thermal expansion" is the degree of expansion divided by the change in temperature and can vary with temperature. In one aspect, the glass compositions disclosed herein have volumetric coefficients of thermal expansion ($\alpha_{300}$) ranging from $70\times10^{-7}/°$ C. to $85\times10^{-7}/°$ C. over the range from room temperature to 300° C. In some embodiments, the coefficient of thermal expansion $\alpha_{300}$ over the temperature range from room temperature to 300° C. is about $75\times10^{-7}/°$ C. to $85\times10^{-7}/°$ C.; or $80\times10^{-7}/°$ C. to $85\times10^{-7}/°$ C.

As used herein, the terms "softening point" and "softening temperature" refer to the temperature at which a glass flows and has a viscosity of $10^{7.6}$ poise (P). wherein a softening point of the glass composition is below about 700 degrees Celsius.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A glass composition, comprising:
   $SiO_2$ from 25 wt % to 60 wt %,
   $Al_2O_3$ from 0 wt % to 20 wt %,
   $ZrO_2$ from 0 wt % to 5 wt %,
   $Li_2O$ from 5 wt % to 17 wt %,
   $Na_2O$ from 3 wt % to 10 wt %,
   $K_2O$ from 1 wt % to 10 wt %,
   RO from 0 wt % to 20 wt %, wherein RO comprises an alkaline earth oxide,
   ZnO from 0 wt % to 15 wt %,
   greater than or equal to 0 wt % and less than 10 wt % $B_2O_3$, and
   0 wt % lead,
   wherein RO+ZnO is greater than 10 wt %, and
   wherein a coefficient of thermal expansion of the glass composition is greater than or equal to $70\times10^{-7}$ per degrees Celsius and less than $85\times10^{-7}$ per degrees Celsius.

2. The glass composition of claim 1, wherein RO comprises greater than 5 wt % CaO.

3. The glass composition of claim 1, wherein RO comprises at least one of CaO, MgO, SrO, or BaO.

4. The glass composition of claim 3, wherein CaO is greater than 1 wt % and less than or equal to 20 wt %.

5. The glass composition of claim 3, wherein CaO is greater than 2 wt % and less than or equal to 20 wt %.

6. The glass composition of claim 1, wherein $ZrO_2$ is greater than 1.5 wt % and less than or equal to 3 wt %.

7. The glass composition of claim 1, wherein $Li_2O$ is greater than or equal to 5.1 wt % and less than or equal to 17 wt %.

8. The glass composition of claim 1, wherein $Al_2O_3$ is greater than 9 wt % and less than or equal to 15 wt %.

9. The glass composition of claim 1, wherein ZnO is greater than or equal to 1 wt % and less than or equal to 4 wt %.

10. The glass composition of claim 1, wherein $K_2O$ is greater than or equal to 1 wt % and less than 5 wt %.

11. The glass composition of claim 1, wherein $Li_2O+Na_2O+K_2O$ is 10 wt % to 22 wt %.

12. The glass composition of claim 1, wherein the composition has at least one of:
   a softening point below about 700 degrees Celsius, or
   a glass transition temperature ($T_g$) of 450 degrees Celsius to 550 degrees Celsius.

13. A glass composition, comprising:
   $SiO_2$ from 30 wt % to 50 wt %,
   $Al_2O_3$ from 6 wt % to 15 wt %,
   $B_2O_3$ from 14 wt % to 28 wt %,
   $ZrO_2$ from 0 wt % to 3 wt %,
   $Li_2O$ from 3 wt % to 7 wt %,
   $Na_2O$ from 3 wt % to 8 wt %,
   $K_2O$ from 2 wt % to 8 wt %,
   RO from 0 wt % to 5 wt %, wherein RO comprises an alkaline earth oxide,
   ZnO from 1 wt % to 8 wt %, and
   0 wt % lead.

14. The glass composition of claim 13, wherein RO is one of CaO, MgO, SrO, BaO.

15. The glass composition of claim 13, wherein $Li_2O+Na_2O+K_2O$ is 10 wt % to 22 wt %.

16. The glass composition of claim 13, wherein $Li_2O+Na_2O+K_2O$ is 13 wt % to 20 wt %.

17. The glass composition of claim 13, wherein the glass composition has at least one of:
   a coefficient of thermal expansion of the glass composition is about $70\times10^{-7}$ per degrees Celsius to $85\times10^{-7}$ per degrees Celsius;
   a softening point of below about 700 degrees Celsius; or a glass transition temperature ($T_g$) of 450 degrees Celsius to 550 degrees Celsius.

* * * * *